(12) United States Patent
Couston et al.

(10) Patent No.: US 8,672,617 B2
(45) Date of Patent: Mar. 18, 2014

(54) ENERGY CONVERSION HYDRAULIC PLANT AND METHOD FOR CONTROLLING SUCH PLANT

(75) Inventors: Michel Henri Couston, Seyssins (FR); Michel Sabourin, Sorel-Tracy (CA)

(73) Assignee: Alstom Renewable Technologies, Grenoble (FR)

( * ) Notice: Subject to any disclaimer, the term of this patent is extended or adjusted under 35 U.S.C. 154(b) by 939 days.

(21) Appl. No.: 12/741,740

(22) PCT Filed: Nov. 14, 2008

(86) PCT No.: PCT/FR2008/052054
§ 371 (c)(1),
(2), (4) Date: Jun. 22, 2010

(87) PCT Pub. No.: WO2009/068828
PCT Pub. Date: Jun. 4, 2009

(65) Prior Publication Data
US 2010/0260622 A1    Oct. 14, 2010

(30) Foreign Application Priority Data
Nov. 14, 2007 (FR) ...................... 07 59023

(51) Int. Cl.
F03B 15/02 (2006.01)
(52) U.S. Cl.
USPC ......... 415/145; 415/148; 415/207; 415/211.2
(58) Field of Classification Search
USPC .............. 415/144, 145, 146, 148, 182.1, 207, 415/211.2
See application file for complete search history.

(56) References Cited

U.S. PATENT DOCUMENTS

| 2,598,207 | A | * | 5/1952 | Bailey et al. | 251/61.1 |
| 6,114,773 | A | * | 9/2000 | Kouris | 290/52 |
| 2005/0069413 | A1 | | 3/2005 | Wobben | |

FOREIGN PATENT DOCUMENTS

| FR | 789467 | 10/1935 |
| JP | 57137774 | 8/1982 |
| JP | 2000346214 | 12/2000 |
| JP | 2005194728 | 7/2005 |
| WO | 2006/035119 | 4/2006 |
| WO | 2006/053878 | 5/2006 |

* cited by examiner

Primary Examiner — Edward Look
Assistant Examiner — Juan G Flores
(74) Attorney, Agent, or Firm — Buchanan Ingersoll & Rooney PC

(57) ABSTRACT

The invention relates to a hydraulic plant (I) that defines a path (4, 5, 6) for a forced water flow (E), and comprises at least one machine (1) of the turbine, pump or turbine-pump type, a member (8) provided with at least one deformable wall (81) and defining at least one closed volume (V8) with variable dimensions. The plant also includes means (9, 91) for supplying (Fg) the closed volume with a pressurized fluid. The member with a deformable wall (81) is mounted in a hydraulic duct (6) located downstream from a rotary portion (2) of the machine (1). The deformable wall defines, locally and downstream from the rotary portion (2), a modular section (S63) for the flow (E) passage in the hydraulic duct (6). According to the method of the invention, a pressurized fluid is injected (F9) into a closed volume having variable dimensions (V8) and defined by a member (8) provided in a hydraulic duct (6) located downstream from the rotary portion (2), in order to modulate the passage section (S63).

26 Claims, 3 Drawing Sheets

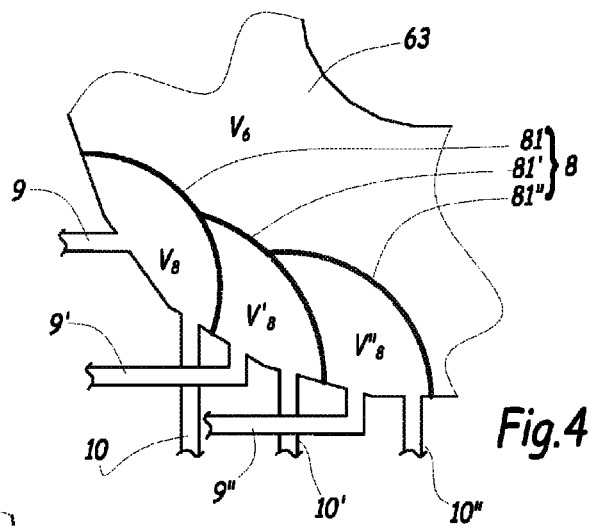
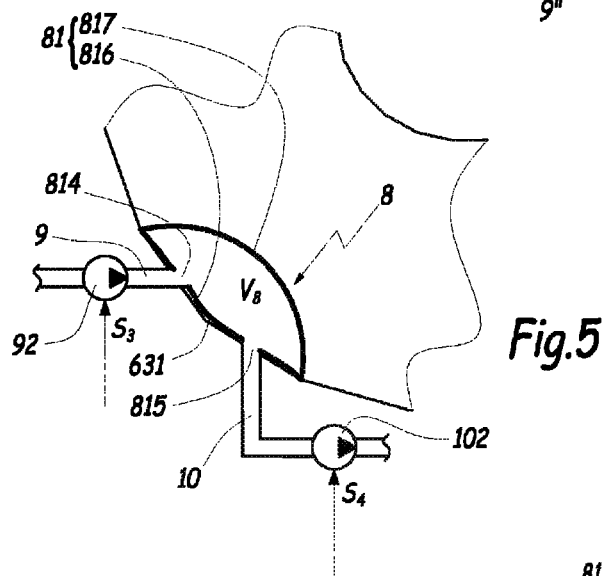
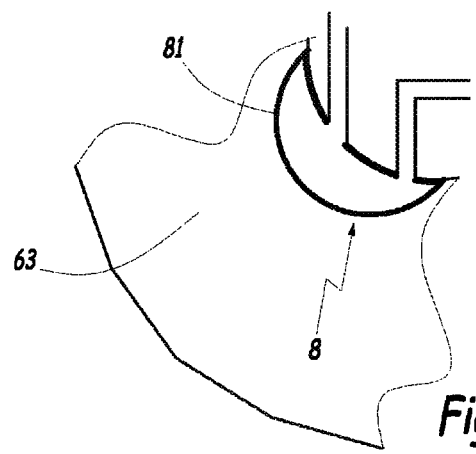

ENERGY CONVERSION HYDRAULIC PLANT AND METHOD FOR CONTROLLING SUCH PLANT

The present invention relates to a hydraulic installation for converting hydraulic energy into mechanical or electrical energy or vice versa which comprises a machine, of the turbine, pump or turbine-pump type, and in which is defined a hydraulic path for the forced flow of water.

It is known practice to design such a hydraulic installation as a function of a nominal operating point which depends, for example, on the head and the power desired as the output of the installation. In practice, the effectiveness of a turbine and its dynamic behavior are largely influenced by the hydraulic conditions, such as the water levels and the flow rates prevailing in the lakes and rivers in the vicinity of which a turbine is installed, and the operating needs which determine the quantity of water passing through the turbine. However, the design of the various hydraulic ducts of an installation is mainly adapted to an operating point and may be unsuitable for certain speeds, particularly in the case of an installation refurbished by installing a new turbine.

It is known practice, for example from WO-A-2006/035119 or from WO-A62006/053878, to have a flexible body about the rotating portion of the turbine in order to increase the radial distance between the blades of the turbine and the wheel shroud in the event of a high flow rate. This increase in the radial distance creates a zone of water flow with no interaction with the turbine which causes a reduction in efficiency of the installation. It is also known practice, from US-A-2005/0069413, to fit the rotating hub of a turbine with an expandable bellows which makes it possible to reduce the zone of water flow around this hub. In the flattened configuration of this bellows, the base trunnions of the blades protrude from the hub so that the portion of the flow which sweeps the hub does not interact with the curved portions of the blades. This therefore reduces the efficiency of the installation.

Moreover, in the installations provided with a downstream flow duct, sometimes called the "draft tube" because of its divergent shape in the direction of flow, it happens that the forced flow does not totally fill the duct, which causes phenomena of separation of the flow from the surface of the duct at certain speeds.

Similar problems occur with pumps and turbine-pumps.

It is these drawbacks more particularly that the invention is designed to remedy by proposing an installation that can operate in an optimized manner at different speeds.

Accordingly, the invention relates to a hydraulic installation defining at least one path for the forced flow of water and comprising at least one machine, of the turbine, pump or turbine-pump type, a member provided with at least one deformable wall and delimiting at least one closed volume of variable size and means for supplying the closed volume with pressurized fluid. This installation is characterized in that the member with a deformable wall is mounted in a hydraulic duct situated downstream of a rotating portion of the machine and in that the deformable wall defines, locally and downstream of the rotating portion, an adjustable cross-section for the flow in the hydraulic duct.

By virtue of the invention, it is possible to adapt the geometry of the hydraulic duct for the forced flow of water, downstream of the rotating portion of the machine, according to the operating point selected for the installation, which makes it possible to optimize the behavior and performance of the installation over a wide operating range. The invention is applicable to refurbished installations and new installations. The invention relates to all types of hydraulic turbines, particularly Francis turbines, Kaplan turbines, "propeller" or "diagonal" turbines, bulb turbines and pumps and turbine-pumps. For all these machines, the member with a deformable wall is placed downstream of a rotating portion, the blades of a Kaplan turbine for example.

Within the meaning of the invention, a hydraulic machine is the portion of an installation in which the transfer of energy takes place between the flow and a rotating portion. Such a machine does not include the flow intake and discharge ducts. An example of a rotating portion of a machine is the wheel of a Francis turbine.

With the possibility of adjusting the shape of a wall defining the flow cross-section of the hydraulic duct in certain zones downstream of the installation, it is possible to improve not only the overall effectiveness of the installation but also reduce the pressure fluctuations, the power swings, the cavitation and oxygen dissolution phenomena, and the noise and vibration generated by the rotation of the rotating portion. The invention also makes it possible to improve the stability of the installation and have a positive influence on the runaway speed and the peak speed of the rotating portion, and on its capacity to allow living animals to pass through it, sometimes called "fish friendly capacity".

The fact that the member with a deformable wall is housed in the duct downstream of the wheel makes it possible to control the flow in this downstream duct in order to remove, or to greatly limit, the phenomena of separation of the flow. The use of the member with a deformable wall improves the operation of the hydraulic machine. In particular, it makes it possible to reduce the fluid losses caused by local phenomena when they occur.

According to advantageous, but not mandatory, aspects of the invention, such an installation can incorporate one or more of the following features, taken in all technically admissible combinations:

- The aforementioned member comprises at least one deformable membrane attached to a structural element of the installation and defining with this structural element the closed volume of variable size. The pressurized fluid is used to inflate the membrane(s) to form a wall with variable configuration.
- As a variant, the aforementioned member is formed by at least one balloon formed by a deformable membrane and delimiting on its own the closed volume of variable size.
- At least one attachment advantageously links a middle zone of the deformable membrane to the structural element or two zones of the membrane together, this attachment being capable of limiting the deformation of the membrane under the effect of the pressure of the fluid present in the closed volume.
- The member with a deformable wall delimits several closed volumes of variable size supplied with a pressurized fluid, independently of one another.
- The member with a deformable wall is mounted on a fixed portion of the installation. It may be placed at a bend formed by the hydraulic duct downstream, on its outer portion or its inner portion. As a variant, the member with a deformable wall is placed upstream or downstream of the bend.
- The hydraulic duct situated downstream of the rotating portion is at least partly divergent.
- The means for supplying the closed volume delimited by the regulating member comprise at least one channel linking a controlled source of pressurized water to this closed volume. As a variant, these means comprise at least one channel linking a controlled source of a pressurized fluid other than water to this closed volume.

Means for discharging the pressurized fluid from the closed volume delimited by the regulating member are provided.

The invention also relates to a method for controlling an installation as described above and, more specifically, a method that comprises a step consisting in injecting a pressurized fluid into at least one closed volume delimited by a member provided with at least one deformable wall and placed in a hydraulic duct situated downstream of a rotating portion of the machine, in order to adjust a cross-section, for the forced flow in the hydraulic duct, downstream of the rotating portion.

By virtue of the method of the invention, it is possible to act on the geometry of a flow duct, as a function of the operating point selected for the installation, in order to optimize its performance.

The invention will be better understood and other advantages of the latter will appear more clearly in the light of the following description of four embodiments of an installation according to its principle, given only as an example and made with reference to the appended drawings in which:

FIG. 4 is a view similar to FIG. 2 for an installation according to a second embodiment of the invention;

FIG. 5 is a view similar to FIG. 2 for an installation according to a third embodiment of the invention; and FIG. 6 is a view similar to FIG. 2 for an installation according to a fourth embodiment of the invention.

Figure 1:
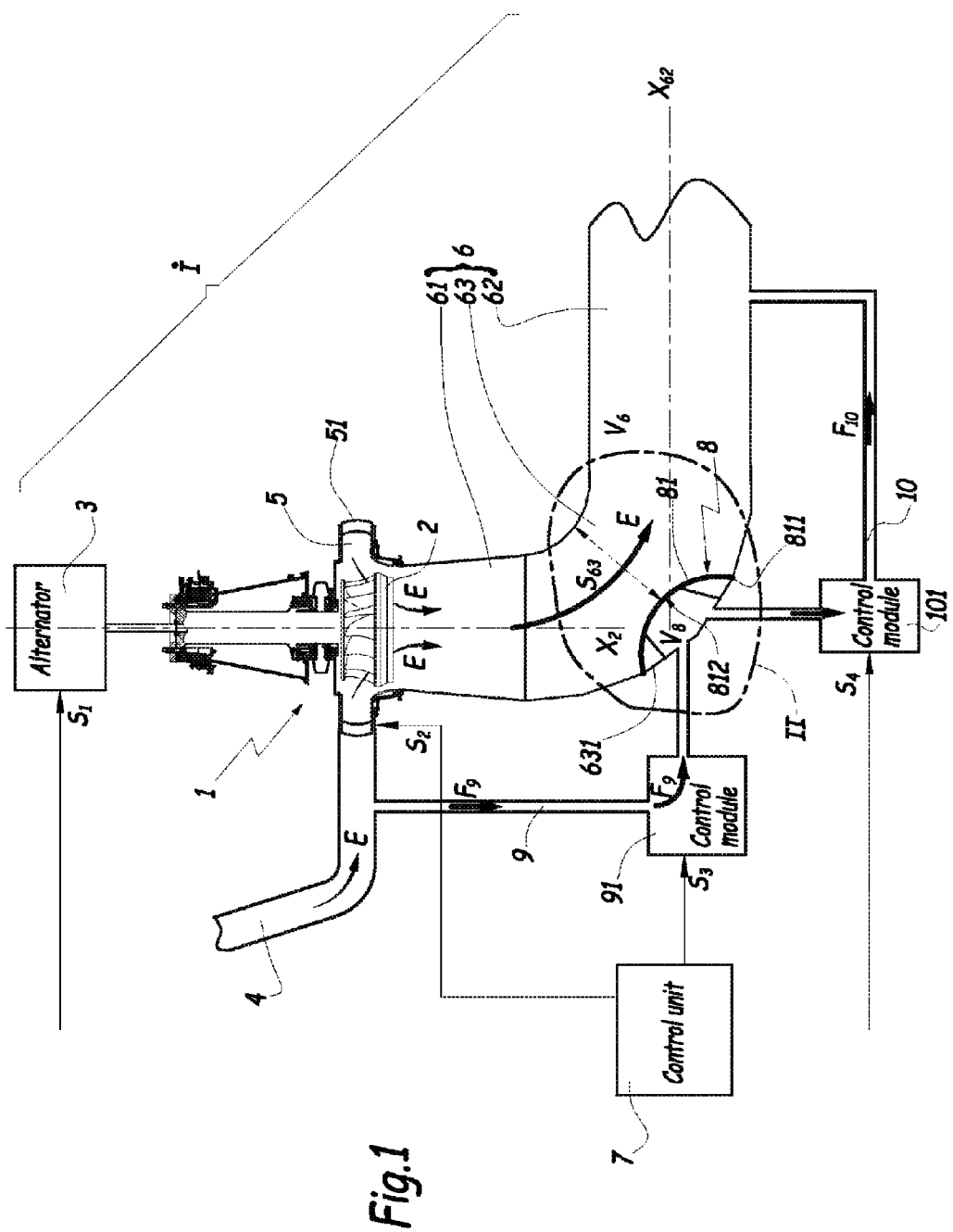
FIG. 1 is a schematic representation, in axial section, of an installation according to a first embodiment of the invention.
Figure 2:
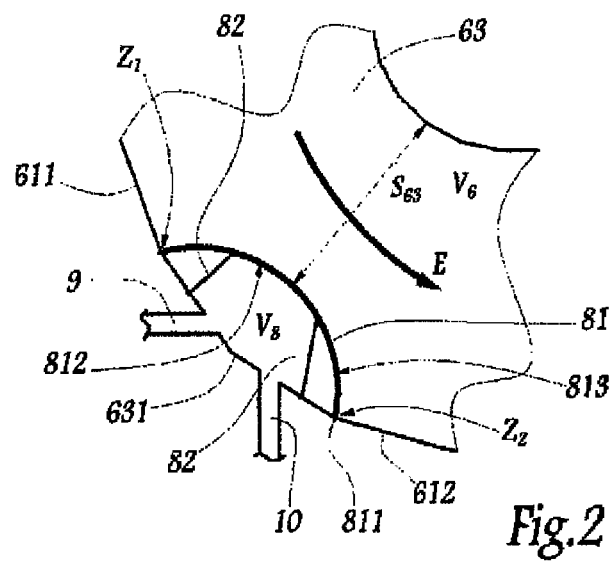
FIG. 2 is a view on a larger scale of the detail II in FIG. 1.
Figure 3:
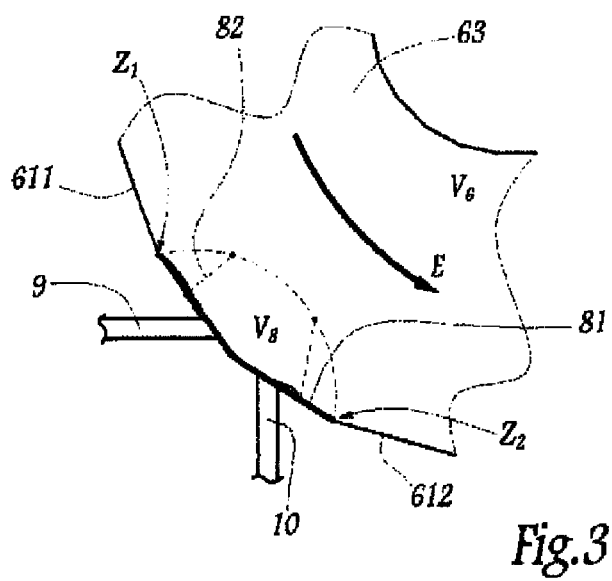
FIG. 3 is a view similar to FIG. 2 when the installation is in another operating configuration.

The installation I shown in FIGS. 1 to 3 comprises a turbine 1 of the Francis type the wheel 2 of which is designed to be rotated by a forced flow E originating from a volume of water not shown. The wheel 2 forms a rotating portion of the turbine 1. The turbine 1 is coupled to an alternator 3 which delivers an alternating current to a network not shown, depending on the rotation of the wheel 2. The installation I therefore makes it possible to convert the hydraulic energy of the flow E into electrical energy. A forced duct 4 makes it possible to bring the flow E to the wheel 2 and extends between the volume of water and a housing 5 fitted with wicket gates 51 making it possible to partly regulate the flow E. A duct 6 is provided downstream of the wheel 2 in order to discharge the flow E downstream of the installation I and return it to a river from which it is taken.

The elements 4, 5 and 6 define together a hydraulic path for the flow E.

A control unit 7 is provided to control the turbine 1 according, in particular, to the electricity needs of the network supplied from the alternator 4. The unit 7 is capable of defining several operating points of the installation I and of sending, respectively to the alternator 3 and to the wicket gates 51, control signals $S_1$, $S_2$.

The duct 6 comprises an upstream portion 61 that is substantially vertical and centered on the axis of rotation $X_2$ of the wheel 2, a downstream portion 62 centered on an axis $X_{62}$ slightly ascending in the direction of the flow E, and a bend 63 linking the portions 61 and 62. $V_6$ indicates the internal volume of the duct 6.

The duct 6 can be qualified as a "draft tube" because it is divergent over at least a portion of its length, in the direction of the flow E, that is to say that the area of its cross section increases in the direction of this flow. This divergent quality could cause phenomena of separation of the flow E relative to the internal surfaces of the duct 6, particularly at the bend 63. These phenomena would then disrupt the passage of the water in the duct 6, in particular because of the recirculation of water in the turbulent zones.

A member 8 for adjusting the flow E in the duct 6 is placed on the outer portion 631 of the bend 63. This adjusting member comprises a deformable membrane 81 attached along its periphery 811 to the wall 631. Therefore, between the wall 631 and the face 812 of the membrane 81 directed toward this wall, a closed volume $V_8$ is defined, in the sense that it is isolated from the rest of the internal volume $V_6$ by the membrane 81.

The installation I also comprises a pipe 9 which forms a channel and links the duct 4 to the volume $V_8$. This pipe is fitted with a module 91 forming a valve for controlling the water flow in the pipe 9, this water flow being represented by the arrows $F_9$. The module 91 is controlled by the unit 7 by means of an appropriate signal $S_3$.

It is therefore possible to inject water into the volume $V_8$, by causing water to flow in the pipe 9, as shown by the arrows $F_9$. The module 91 forms, for the member 8, a controlled source of pressurized water which makes it possible to pressurize the volume $V_8$.

Moreover, a pipe 10 makes it possible to discharge, when necessary, the water that is present in the volume $V_8$ toward the downstream portion 62 of the duct 6. The pipe 10 is fitted with a module 101 controlling the flow of water in the pipe 10, this flow being represented by the arrows $F_{10}$. The module 101 is controlled by the unit 7 by means of an appropriate signal $S_4$.

It is therefore possible, by virtue of the unit 7, to control the pressure of the water that is present in the volume $V_8$ and, consequently the geometry of the membrane 81 which defines the flow cross-section $S_{63}$ of the bend 63, that is to say the geometry of the duct 6 in the zone of the bend 63.

As emerges from comparing FIGS. 2 and 3, the membrane is flexible to the point of passing from a configuration shown in FIG. 3, in which it is flattened by the flow E against the portion 631, to the configuration of FIG. 2 where it forms, seen from the side of the flow E in the duct 6, a convex surface. The cross-section $S_{63}$ of the flow E can therefore be adjusted, as a function of the supply of the volume $V_8$ with pressurized water from the duct 4, between the value shown in FIG. 3 and that shown in FIG. 2.

Intermediate values can be obtained subject to an appropriate control of the modules 91 and 101 by virtue of the signals $S_3$ and $S_4$.

FIG. 3 shows in dashed lines the outline of the membrane 81 in the configuration of FIG. 2.

Reducing the area of the section $S_{63}$, when the membrane 81 passes from the configuration of FIG. 3 to that of FIG. 2, makes it possible to accelerate the flow E in the bend 63 which is advantageous in certain operating configurations of the turbine 1, particularly in order to prevent phenomena of separation of the flow E. The passage of the membrane 81 from the configuration of FIG. 3 to that of FIG. 2 also makes it possible to modify the direction of the flow E in the bend 3, which may also be advantageous.

By a judicious choice of the location of the member 8 in the duct 6, it is possible to change, by inflation or deflation of this member, the section law that influences the average and local speeds of the flow E.

The member 8 therefore makes it possible to regulate or adjust the flow E in speed and/or in direction by an appropriate control of the modules 91 and 101 and to do so without degrading the overall efficiency of the installation I because the turbine 1 operates, at its level, with a path for the flow E which remains permanently identical to the nominal path. In other words, the adjustment of the flow E, by virtue of the member 8 placed in the duct 6, does not disrupt the operation of the turbine 1. This adjustment of the flow E causes a local adjustment of the field of speeds of flow E without substantially modifying its total flow rate.

The walls of the portions 61 and 62 in the vicinity of the member 8 are marked respectively 611 and 621. The geometry and the positioning of the membrane 81 are chosen to ensure a good continuity between the outer force 813 of the membrane 81, that is to say its face directed away from the volume $V_8$, relative to the walls 611 and 621, which avoids the creation of turbulence in the transitional zones $Z_1$ and $Z_2$ between the member 8 and the portions 61 and 62 of the duct 6.

In order to effectively control the shape of the member 8 in the completely filled configuration of the volume 8, flexible attachments 82 forming stays extend between the membrane 81 and the wall 631 and limit the deformation of the membrane 81 under the effect of the pressure in the volume $V_8$, in a direction of restriction of the section $S_{63}$.

If, depending on the operating conditions of the installation I, the membrane 81 has to be brought closer to the surface 631 in order to increase the section $S_{63}$, the module 91 is commanded to stop or limit the flow $F_9$ in the pipe 9, while the module 101 is commanded to increase the flow $F_{10}$ in the pipe 10.

According to a variant of the invention, not shown, the pipe 10 can be connected to a suction pump.

The membrane 81 can be sealed but this is not essential because the function of the member 8 is compatible with a slight leakage from the volume $V_8$ to the volume $V_6$, provided that the pressure of the water in the volume $V_8$ is sufficient to keep the membrane 81 in a position determined by the unit 7, without this membrane vibrating because of the turbulent nature of the flow E in the bend 63.

The material used to form the membrane 81 must be flexible, thin and strong. It must in particular withstand the tension resulting from the water pressure in the volume $V_8$. A composite material may be used for this purpose, for example a material based on Kevlar (registered trade mark) fibers. It is also possible to envisage the use of a membrane that is elastic or slightly elastic, or even a combination of membranes with different elasticities, these membranes being positioned in order to produce optimal wall shapes.

The links or attachments 82 may be formed by cords, cables, or woven fabric strips. They extend only over a small portion of the width of the volume $V_8$ so as not to hamper the distribution of the water in this volume.

In the second embodiment of the invention shown in FIG. 4, the elements similar to those of the first embodiment bear identical references. In this embodiment, the member 8 is formed of three membranes 81, 81' and 81" which define three volumes $V_8$, $V'_8$ and $V''_8$ each supplied by a duct 9, 9' and 9" like the duct 9 of the first embodiment. Therefore, depending on which volume or volumes $V_8$, $V'_8$ and $V''_8$ are supplied with pressurized water, different geometries of the member 8 can be obtained, which makes it possible to regulate the flow E in the bend 63 in different ways. Ducts 10, 10' and 10" make it possible to discharge the water present respectively in the volumes $V_8$, $V'_8$ and $V''_8$. The ducts 10, 10' and 10" are provided with flow-regulation means not shown which are controlled independently, in order to control independently the "inflation" and the "deflation" of the volumes $V_8$, $V'_8$ and $V''_8$.

In the third embodiment of the invention shown in FIG. 5, the member 8 is a balloon formed by a deformable and flexible membrane 81 which alone delimits the internal volume $V_8$ of the member 8. The volume $V_8$ is supplied with pressurized air, through an orifice 814 provided in the membrane 81, from a booster pump 92 controlled by a signal $S_3$. A pipe 9 links the pump 92 to the volume $V_8$. A pipe 10 links a suction pump 102 to the volume $V_8$ through a second orifice 815 provided in the membrane 81. The pump 102 is controlled by a signal $S_4$.

The membrane 81 comprises a first portion 816 which is flattened against the outer portion 631 of the bend 63 and in which the orifices 814 and 815 are provided, and a second portion 817 which is connected to the first portion in a sealed manner and which behaves substantially like the membrane 81 of the first embodiment. It is therefore possible, by controlling the pressurized air supply of the volume $V_8$, to act on the apparent geometry of the duct 6 for the flow E passing through the bend 63.

According to a variant not shown of the invention, the central zones of the portions 816 and 817 may be connected via links like the links 82 of the first embodiment, which makes it possible to limit the expansion of the balloon 8 under the effect of the pressure of the air supplied by the pump 92.

The features of the various embodiments envisaged above can be combined. In particular, air can be used as the fluid for inflating the member 8 in the embodiments of FIGS. 1 to 4 and water can be used in the embodiment of FIG. 5. Actually, a pressurized fluid other than water or air can also be envisaged to inflate the closed volume of variable size defined by the regulating member 8 of the invention.

The invention is not limited to the embodiments described and may be applied in portions of the duct 6 other than those represented in FIGS. 1 to 5, in particular in the upstream portion 61 and downstream and portion 62 or on the inside of the bend 63, as shown in FIG. 6.

The invention is not limited to Francis turbines and can be applied with any type of reaction turbine. The invention can also be used in installations comprising a pump or a turbine-pump, in the fixed portions of these installations. In these cases also, the member with a deformable wall is used to adjust the flow cross-section for the forced flow of water downstream of a rotating portion of the hydraulic machine.

The invention claimed is:

1. A hydraulic installation for converting energy defining at least one path for a forced flow of water and comprising at least one machine, of the turbine, pump or turbine-pump type, a member provided with at least one deformable wall and delimiting at least one closed volume of variable size and means for supplying the closed volume with pressurized fluid
   wherein the member with a deformable wall is mounted in a hydraulic duct situated downstream of a rotating portion of the machine and wherein the deformable wall defines, locally and downstream of the rotating portion, an adjustable cross-section ($S_{63}$) for the flow in the hydraulic duct,
   wherein the member comprises at least one deformable membrane attached to a structural element of the installation and defining with this structural element the closed volume of variable size, and
   wherein the installation further comprises at least one attachment linking a middle zone of the deformable membrane to the structural element, this attachment being capable of limiting the deformation of the membrane under the effect of the pressure of the fluid present in the closed volume of variable size.

2. The installation as claimed in claim 1, wherein the member with a deformable wall is mounted on a fixed portion of the installation.

3. The installation as claimed in claim 1, wherein the hydraulic duct forms a bend and the member with a deformable wall is placed at this bend.

4. The installation as claimed in claim 3, wherein the member with a deformable wall is placed on the outer portion of the bend.

5. The installation as claimed in claim 3, wherein the member with a deformable wall is placed on the inner portion of the bend.

6. The installation as claimed in claim 3, wherein the hydraulic duct forms a bend and the member with a deformable wall is placed upstream of the bend.

7. The installation as claimed in claim 3, wherein the hydraulic duct forms a bend and the member with a deformable wall is placed downstream of the bend.

8. The installation as claimed in claim 1, wherein the hydraulic duct situated downstream of the rotating portion is at least partly divergent.

9. The installation as claimed in claim 1, wherein the supply means comprise at least one channel linking a controlled source of pressurized water to the closed volume of variable size delimited by the member with a deformable wall.

10. The installation as claimed in claim 1, wherein the supply means comprise at least one channel linking a controlled source of pressurized fluid other than water to the closed volume delimited by the member with a deformable wall.

11. The installation as claimed in claim 1, wherein it comprises means for discharging the pressurized fluid from the closed volume of variable size delimited by the regulating member.

12. A method for controlling a hydraulic installation according to claim 1, said installation defining at least one path for a forced flow of water and comprising a machine of the turbine, pump or turbine-pump type, wherein said method comprises a step consisting in injecting a pressurized fluid into at least one closed volume delimited by the member provided with at least one deformable wall in order to adjust a cross-section for the flow in the hydraulic duct, downstream of the rotating portion.

13. A hydraulic installation for converting energy defining at least one path for a forced flow of water and comprising at least one machine, of the turbine, pump or turbine-pump type, a member provided with at least one deformable wall and delimiting at least one closed volume of variable size and means for supplying the closed volume with pressurized fluid,
wherein the member with a deformable wall is mounted in a hydraulic duct situated downstream of a rotating portion of the machine and wherein the deformable wall defines, locally and downstream of the rotating portion, an adjustable cross-section ($S_{63}$) for the flow in the hydraulic duct,
wherein the member with a deformable wall delimits several closed volumes of variable size supplied with a pressurized fluid independently of one another.

14. A method for controlling a hydraulic installation according to claim 13, said installation defining at least one path for a forced flow of water and comprising a machine of the turbine, pump or turbine-pump type, wherein said method comprises a step consisting in injecting a pressurized fluid into at least one closed volume delimited by the member provided with at least one deformable wall, in order to adjust a cross-section for the flow in the hydraulic duct, downstream of the rotating portion.

15. A hydraulic installation for converting energy defining at least one path for a forced flow of water and comprising at least one machine, of the turbine, pump or turbine-pump type, a member provided with at least one deformable wall and delimiting at least one closed volume of variable size and means for supplying the closed volume with pressurized fluid
wherein the member with a deformable wall is mounted in a hydraulic duct situated downstream of a rotating portion of the machine and wherein the deformable wall defines, locally and downstream of the rotating portion, an adjustable cross-section ($S_{63}$) for the flow in the hydraulic duct,
wherein the member is a balloon formed by a deformable membrane and delimiting on its own the closed volume of variable size, and
wherein the installation further comprises at least one attachment linking two zones of the membrane together, this attachment being capable of limiting the deformation of the membrane under the effect of the pressure of the fluid present in the closed volume of variable size.

16. The installation as claimed in claim 15, wherein the member with a deformable wall is mounted on a fixed portion of the installation.

17. The installation as claimed in claim 15, wherein the hydraulic duct forms a bend and the member with a deformable wall is placed at this bend.

18. The installation as claimed in claim 17, wherein the member with a deformable wall is placed on the outer portion of the bend.

19. The installation as claimed in claim 17, wherein the member with a deformable wall is placed on the inner portion of the bend.

20. The installation as claimed in claim 17, wherein the hydraulic duct forms a bend and the member with a deformable wall is placed upstream of the bend.

21. The installation as claimed in claim 17, wherein the hydraulic duct forms a bend and the member with a deformable wall is placed downstream of the bend.

22. The installation as claimed in claim 15, wherein the hydraulic duct situated downstream of the rotating portion is at least partly divergent.

23. The installation as claimed in claim 15, wherein the supply means comprise at least one channel linking a controlled source of pressurized water to the closed volume of variable size delimited by the member with a deformable wall.

24. The installation as claimed in claim 15, wherein the supply means comprise at least one channel linking a controlled source of pressurized fluid other than water to the closed volume delimited by the member with a deformable wall.

25. The installation as claimed in claim 15, wherein it comprises means for discharging the pressurized fluid from the closed volume of variable size delimited by the regulating member.

26. A method for controlling a hydraulic installation according to claim 15, said installation defining at least one path for a forced flow of water and comprising a machine of the turbine, pump or turbine-pump type, wherein said method comprises a step consisting in injecting a pressurized fluid into at least one closed volume delimited by the member provided with at least one deformable wall, in order to adjust a cross-section for the flow in the hydraulic duct, downstream of the rotating portion.

* * * * *